United States Patent [19]

Rim et al.

[11] 4,162,276

[45] Jul. 24, 1979

[54] NONBURNING, NON-DRIPPING POLYURETHANE COMPOSITIONS

[75] Inventors: Yong S. Rim, Woodbridge; Walter Nudenberg, Newtown, both of Conn.

[73] Assignee: Uniroyal, Inc., New York, N.Y.

[21] Appl. No.: 901,874

[22] Filed: May 1, 1978

[51] Int. Cl.$^2$ .......................... C08K 5/34; C08K 5/53; C08L 75/04
[52] U.S. Cl. .................................. 525/2; 260/45.7 P; 260/45.7 R; 260/45.8 NT; 260/45.95 G; 525/160; 525/126
[58] Field of Search .................. 260/2.5 AJ, 45.7 P, 260/45.8 NT, 606.5 P (U.S. only), 859 PV (U.S. only)

[56] References Cited

U.S. PATENT DOCUMENTS

| | | | |
|---|---|---|---|
| 3,121,082 | 2/1964 | Guttag | 260/2.5 AJ |
| 3,257,337 | 6/1966 | Schoepfle et al. | 260/2.5 AJ |
| 3,644,456 | 2/1972 | Ulrich | 260/2.5 AJ |
| 3,803,225 | 4/1974 | Smith et al. | 260/45.7 P |
| 3,855,352 | 12/1974 | Moedritzer | 260/45.7 P |
| 3,882,191 | 5/1975 | Balatoni et al. | 260/859 PV |
| 3,966,478 | 6/1976 | Toy et al. | 260/2.5 AJ |
| 3,970,716 | 7/1976 | Evers et al. | 260/859 PV |
| 4,010,209 | 3/1977 | Smith et al. | 260/606.5 P |
| 4,021,405 | 5/1977 | Tucker et al. | 260/45.8 NT |
| 4,064,104 | 12/1977 | Mrowca | 260/606.5 P |

*Primary Examiner*—Hosea E. Taylor
*Assistant Examiner*—R. A. White
*Attorney, Agent, or Firm*—Anthony Lagani, Jr.

[57] ABSTRACT

Non-dripping, self-extinguishing polyurethane elastomers comprising, a hexaalkoxymethylmelamine; an organic halogen-containing a compound and a P-substituted phosphocyclopentane 1-oxide incorporated into a polyurethane elastomer.

14 Claims, No Drawings

NONBURNING, NON-DRIPPING POLYURETHANE COMPOSITIONS

BACKGROUND OF INVENTION

Polyurethanes which are flame-retardant are highly desired and required for many applications especially as the pressure for flame-retarded products increases in the legislative area. In general, imparting a specified level of flame-retardancey to polyurethane polymers can be accomplished with relative ease by compounding with flame-retardant compounds either before or after the polycondensation reaction leading to the formation of the polymer. Flame-retardants, classified by function, fall logically into three major classes: reactive, additive and synergistic.

The most widely used flame-retardants for polyurethanes are the additive type [1] such as the halogenated aliphatic hydrocarbons in conjunction with synergists such as antimony compounds. The synergist enhances the effectiveness of the flame retardant and thereby provides higher levels of flame-retardance at moderate flame retardant use levels without significantly compromising other desirable physical properties.
(1) Modern Plastics Encyclopedia, p. 228, 1974-1975.

Flexible polyurethanes, both solid and foamed, are more difficult to flame-retard while maintaining an acceptable balance of properties. The flexible polyurethane molecules are longer and more delicate than the rigid molecules and are therefore more sensitive to the loss of key physical properties with minor changes in composition. The flexible molecules are also more flammable than the molecules of rigid polyurethanes because they contain a higher percentage of flammable components such as aliphatic polyethers, 70% versus 50% or less for the rigid polyurethanes. An additional drawback of flame-retardant flexible polyurethanes is the phenomenon of dripping of the melted polyurethane polymer while it is burning during and shortly after ignition. The flaming droplets may spread the flame beyond the site of initial ignition. Indeed, in some compositions, the formulation would be self-extinguishing except for the fact that the dripping away of the melted polymer constantly exposes a fresh new surface of polymer to the fire, and the fire continues to progress.

Thus, this invention is to provide specific additive systems which produce flame-retardant polyurethane elastomeric compositions which are not only self-extinguishing but, unexpectedly also non-dripping. Another object of this invention is to provide additive systems which eliminate the need for antimony trioxide, a known prodegradant of polyurethane polymers. Still another object of this invention is to provide additive systems which do not require the conventional high levels of organic halogen-containing compounds. The combination of self-extinguishment and non-dripping behavior extends the use of the polyurethane elastomer compositions of this invention into such applications as conveyor belting and hose.

SUMMARY OF INVENTION

Polyurethane elastomers are rendered non-dripping and self-extinguishing by incorporating a minor amount of:
1. a hexaalkoxymethylmelamine;
2. an organic halogen-containing compound; and
3. a P-substituted phosphacyclopentene 1-oxide into the elastomer either before or after the poly-condensation reaction leading to the formation of the polymer.

DETAIL DESCRIPTION

This invention relates to flame-resistant polyurethane elastomers which are both self-extinguishing and non-dripping. These elastomers are made by incorporating a minor amount of the following low molecular weight additive systems either before or after the poly-condensation reaction leading to the formation of the polymer: a hexaalkoxymethylmelamine, an organic halogen-containing compound and a P-substituted phosphacyclopentene 1-oxide.

The hexaalkoxymethylmelamines which are operative in this invention have the following formula:

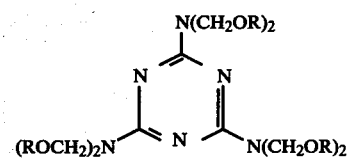

wherein R is a $C_1$–$C_5$ straight or branched chain alkyl group.

Exemplary of the substituted melamines which are operative in this invention are:
hexamethoxymethylmelamine,
hexaethoxymethylmelamine,
hexapropoxymethylmelamine,
hexabutoxymethylmelamine,
hexaisobutoxymethylmelamine and
hexapentoxymethylmelamine, and the like.

The organic, halogen-containing compounds utilized in this invention are the well-known, widely recognized fire-retardant additives for polymers including the chlorine and/or bromine-containing compounds of aliphatic, aromatic, alicyclic or mixed types having a halogen content typically in the range of 35-80% by weight. The halogen compounds selected should be substantially non-volatile, stable and non-reactive toward the polyurethane and any auxiliary ingredients at the processing (curing) temperatures. The halogen compound may optionally be polymeric such as, for example, a polyvinyl halide, neoprene, or chlorinated polyethylene.

Examples of non-polymeric chlorine and bromine compounds useful in the practice of this invention include chlorinated paraffins, marketed under a variety of trademarks such as "Chlorowax", "Unichlor" and "Cereclor", tetrabromoethane, hexabromobutene-2, methyl pentachlorostearate, halogenated aromatics such as hexa-, octa-, and decabromobiphenyls, decabromodiphenyl oxide, hexabromobenzene, tribromophenol, tetrabromosalicylanilide, tetra(pentabromophenoxy)silane, dibromopropyl chlorobenzoate, dibromopropyl maleate, tetrachloro-and tetrabromophthalic anhydrides, tetrachloro-and tetrabromobisphenol A and their bishydroxypropyl derivatives, halogenated cycloaliphatics, such as hexabromocyclododecane, pentabromochlorocyclohexane, bis(cyclohexenyl)ethylene hexabromide, hexachlorocyclopentadiene (HCCPD) and its derivatives (typically Diels-Alder adducts with normal or cyclic dienes or olefins and including, for example, chlorendic anhydride, dimethyl chlorendate, diallyl chlorendate, "Cloran" [1], "Dechlorane 602" [2], "Dechlorane 25" [3], perchloropentacyclodecane, and HCCPD adducts with furan, benzoquinone, 5-vinyl-2-norbornene, cyclooctadiene, pentadiene and the like).
(1) 2,3-dicarboxy-5,8-endomethylene-5, 6, 7, 8, 9, 9-hexachloro-1, 2, 3, 4, 4a, 5, 8, 8a-octahydronaphthelene anhydride.
(2) 1, 2, 3, 4, 6, 7, 8, 9, 10, 10, 11, 11-dodecachloro-1, 4, 4a, 5a, 6, 9, 9a, 9b-octahydro-1, 4, 6, 9-dimethanodibenzofuran.
(3) 1, 4: 7 10-dimethanocycloocta-1, 2, 3, 4, 7, 8, 9, 10, 13, 13, 14, 14-dodecachloro-1, 4, 4a, 5, 6, 6a, 7, 10, 10a, 11, 12, 12a - dodecahydro[1,2: 5, 6]dibenzene.

The structural formulae for Cloran, Dechlorane 602 and Dechlorane 25 are as follows:

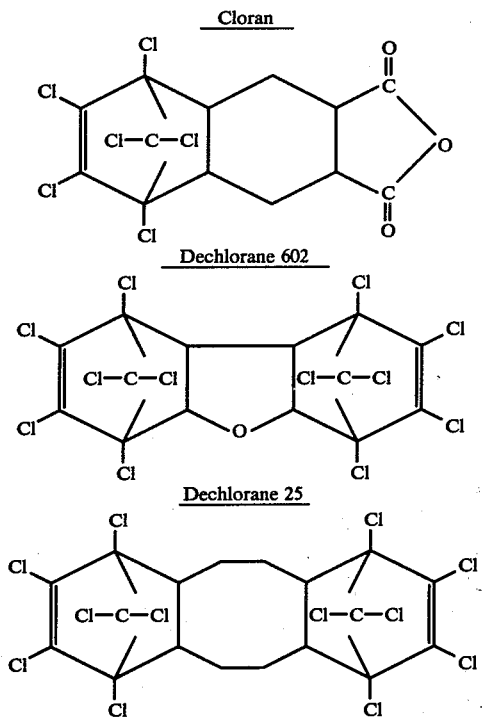

The P-substituted phosphacyclopentene 1-oxides which are operative in this invention have the following formula:

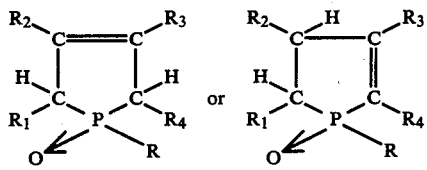

wherein R is a hydrocarbon radical, e.g., $C_1$ to $C_4$ alkyl, phenyl or phenyl substituted with chlorine or bromine and wherein $R_1$, $R_2$, $R_3$ and $R_4$ may be the same or different and are selected from hydrogen, $C_1$ to $C_4$ alkyl, phenyl, chlorine or bromine.

Exemplary of the above phosphacyclopentene 1-oxides are: 1-phenyl-1-phospha-3-cyclopentene 1-oxide; 3-methyl-1-phenyl-1-phospha-3-cyclopentene 1-oxide; 3-methyl-1-ethyl-1-phospha-3-cyclopentene 1-oxide; 3-chloro-1-phenyl-1-phospha-3-cyclopentene 1-oxide; 3-bromo-1-ethyl-1-phospha-3-cyclopentene 1-oxide; and 3-methyl-4-methyl-1-phenyl-1-phospha-3-cyclopentene, 1-oxide; 1-phenyl-1-phospha-2-cyclopentene 1-oxide; 3-ethyl-1-phenyl-1-phospha-2-cyclopentene 1-oxide; 3-n-butyl-1-methyl-1-phospha-2-cyclopentene 1-oxide; 3-bromo-1-phenyl-1-phospha-2-cyclopentene 1-oxide; 3-chloro-1-n-propyl-1-phospha-2-cyclopentene 1-oxide; 3-ethyl-2-ethyl-1-phenyl-1-phospha-2-cyclopentene 1-oxide; 1-p-chlorophenyl-1-phospha-3-cyclopentene 1-oxide; 3-methyl-1-p-bromophenyl-1-phospha-3-cyclopentene 1-oxide; 3-chloro-1-p-bromophenyl-1-phospha-3-cyclopentene 1-oxide; 1-p-bromophenyl-1-phospha-2-cyclopentene 1-oxide; 3-ethyl-1-p-chlorophenyl-1-phospha-2-cyclopentene 1-oxide; 3-ethyl-2-methyl-1-p-chlorophenyl-1-phospha-2-cyclopentene-1-oxide and the like.

The polyurethane elastomers which are operable in this invention are those which are prepared utilizing the prepolymer technique. The prepolymer is formed by reacting an organic polyhydroxyl compound with an organic polyisocyanate in the presence of a catalyst and low molecular weight organic polyhydroxyl chain extender to form a hydroxyl-terminated prepolymer.

The prepolymer is then treated with additional polyisocyanate and heated at moderate temperatures to effect a "cure".

The polyhydroxyl compounds which may be employed in this invention are those substances having two or more active hydrogen atoms as determined by the Zerewitinoff method, e.g., the polyalkylene polyols which will react with organic polyfunctional isocyanates to give urethane polymers. These polyalkylene polyols, typically having a molecular weight of about 180 to 8000, may include polyesters, polyethers, polyisocyanate modified polyesters, polyisocyanate modified polyester amides, alkylene glycols, polymercaptans, polyamines, polyisocyanate modified alkylene glycols, etc. It will be understood that these polyalkylene polyols may have active primary or secondary hydroxyl groups. The polyalkylene polyol may be a hydroxyl-containing polyether or polyester including fatty acid glycerides. Polyesters, which are a preferred type of polyalkylene polyol, may be obtained by esterification condensation reaction of, e.g., an aliphatic dibasic carboxylic acid with a glycol or a triol or mixture thereof in proportions such that the resultant polyesters may contain predominantly terminal hydroxyl groups. Dibasic carboxylic acids suitable for preparing polyesters may include aliphatic and aromatic acids such as adipic acid, fumaric acid, sebacic acid, phthalic acid; suitable alcohols include ethylene glycols, diethylene glycols, trimethylol propane, etc. The fatty acid glycerides may include those having a hydroxyl number of at least about 50 such as castor oil, hydrogenated castor oil, or blown natural oils.

Examples of useful branch chain polyether polyols containing a plurality of functional hydroxyl terminal groups are the reaction products of glycerol, trimethylol propane, pentaerythritol, 1,2,6-hexane triol, phloroglucinol, trimethylol benzene, trimethylol phenol, styrene-vinyl alcohol copolymer, sucrose, sorbitol and similar polyhydric materials reacted with glycols and the like such as propylene glycol, butylene glycol, mixtures of ethylene and propylene glycol and the like in the presence of catalysts with removal of water. They also may be reacted with alkylene oxides such as propylene oxide, butylene oxide, mixtures of ethylene oxide and propylene oxide and the like. Mixtures of the monomers forming the polyether polyols as well as the mixtures of the branched chain polyether polyols themselves may be used. The branch chain polyether polyols have at least 3 functional hydroxyl radicals but may have up to 8 or more functional hydroxyl radicals.

Examples of linear or substantially linear polyether polyols are those polyalkylene ether glycols derived from alkylene oxides, glycols, heterocyclic ethers and other materials by polymerization, copolymerization and the like. For example, tetrahydrofuran may be polymerized in the presence of catalytic amounts of flurosulfonic acid to make a polytetramethylene ether glycol having the formula: HO(—CH$_2$CH$_2$CH$_2$CH$_2$O—)$_x$H where x is an integer. Ethylene oxide-propylene oxide mixtures, propylene oxide and the like may be used to make other polyalkylene ether glycols. Glycols may be polymerized in the presence of mineral acid, sulfonic acid or fuller's earth. Still other methods well known to the art may be used in the preparation of polyalkylene ether glycols.

These linear polyether polyols may be represented by the formula: HO(—R—O—)$_x$H, where R is an alkylene or aryl alkylene group and where x is an integer. Moreover, R can be a mixture of alkylene groups, for example, alternating groups or blocks of ethylene and propylene radicals, i.e., a polyethylene-propylene ether glycol. Examples of substantially linear polyalkylene ether glycols are polyethylenepropylene ether glycol, polyneopentylene ether glycol, polytetramethylene ether glycol, polypentamethylene ether glycol, polyhexamethylene ether glycol, poly 4-phenyl hexamethylene ether glycol, poly-1,6-heptamethylene ether glycol and the like. To provide for water resistance, the polyethers should have at least three carbon atoms between oxygen (ether) linkages. However, some of the carbon chains can consist of 2 carbon atoms, so long as there is a predominating number of carbon chains having 3 or more carbon atoms. The average molecular weight of these polyethers may vary from about 180 to about 8000 or more.

The low molecular weight polyhydroxyl compound chain extenders used in this invention are exemplified by those compounds having at least two free hydroxyl groups with a molecular weight ranging from 50 to 500 such as ethylene glycol, propylene glycol, 1,3-butanediol, 1,4-butanediol, butenediol, butynediol, xylyene glycols, amylene glycols, bis($\beta$-hydroxyethyl)aniline, bis(hydroxypropyl)aniline, 1,4-phenylene-bis($\beta$-hydroxyethyl ether), 1,3-phenylene-bis($\beta$-hydroxyethyl ether), hexanediol, triodiglycol and the like and mixtures thereof.

Any suitable organic polyisocyanate may be used in the process of this invention including aromatic, aliphatic and heterocyclic polyisocyanates, for example, ethylene diisocyanate, ethylidene diisocyanate, propylene 1,2-diisocyanate, cyclohexylene-1,2-diisocyanate, m-phenylene diisocyanate, 2,4-tolylene diisocyanate, 2,6-tolylene diisocyanate, 3,3'-dimethyl-4,4'-biphenylene diisocyanate, 3,3'-dichloro-4,4'-biphenylene diisocyanate, p,p'p"-triphenylmethane triisocyanate, 1,8-naphthalene diisocyanate, furfurylidene diisocyanate or polyisocyanates in a blocked or inactive form such as the bis-phenyl carbamates of 2,4-or 2,6-tolylene diisocyanate, p,p'-diphenylmethane diisocyanate, p-phenylene diisocyanate, 1,5-naphthalene diisocyanate and the like. Triisocyanates typically obtained by the reaction of three moles of an arylene diisocyanate with one mole of a triol, for example, the reaction product formed from three moles of tolylene diisocyanate and one mole of hexanetriol or of trimethylol propane, may be employed. A preferred polyisocyanate is the mixture of 80% 2,4-tolylene diisocyanate and 20% 2,6-tolylene diisocyanate.

In some cases, it may be desirable to increase the rate of reaction of the polyhydroxyl compound with the polyisocyanate. This can be accomplished by the use of catalysts, such as, for example, N-ethyl-morpholine, triethylenediamine, dimethyl-benzylamine, N,N-diisopropanal aniline, dimethyl stearyl amine, N,N'-endoethylene piperazine, and mixtures thereof, as well as metal catalysts such as di(phenylmercuric)dodecenyl succinate, dibutyltin-di-2-ethyl hexoate, nickel acetylacetonate, stannous octoate, stannous oleate, cobalt naphthenate, di-n-butyltin dilaurate, dibutyltin diacetate and the like, and mixtures thereof. Some of these compounds promote the rate of reaction between polyhydroxyl compounds and polyisocyanates at elevated temperatures but may have little or no effect at room temperature.

The method of preparation of the flame-resistant, self-extinguishing and non-dripping polyurethane compositions of this invention using the prepolymer technique is to react a polyhydroxyl compound with a polyisocyanate in the presence of a catalyst and a polyol chain extender to form an hydroxyl-terminated prepolymer. To this are added a hexaalkoxymethylmelamine, an organic halogen-containing compound, a P-substituted phosphacyclopentene 1-oxide and finally a polyisocyanate. After mixing, the compounded polyurethane is "cured" by heating at an elevated temperature of from 250° to 350° F. for about five to twenty minutes.

The amount of the melamine compound to be used is in the range of about 3 to about 25 parts by weight per 100 parts by weight of the final polyurethane polymer, with a preferred range of about 3 to about 10 parts. The amount of halogen-containing compound will vary from about 5 to about 25 parts by weight per 100 parts by weight of polymer, with a preferred range of about 5 to about 10 parts. The amount of the P-substituted phosphacyclopentene will vary from about 3 to about 20 parts by weight per 100 parts by weight of the final polyurethane polymer, with a preferred range of about 5 to about 10 parts. Indeed, the flame retarding properties of the P-substituted cyclopentene 1-oxides are so powerful that it becomes possible to use a minimum amount of organic halogen-containing flame retardant in the compositions of this invention.

The preferred polyurethane elastomers which are operative in this invention are the preformed thermoplastic polyurethane elastomers or elastoplastics. These elastoplastics are conventional materials (see, for example, "Polyurethane Technology", by Bruins, Interscience Publisher, pages 198-200; also "Modern Plastics Encyclopedia", 1968, page 289). Examples are such polyether based polyurethanes as those made from 2 moles of polytetramethylene ether glycol, 2 moles of MDI and 1 mole of 1,4-butane diol and polyester based polyurethanes such as are similarly derived from 1,4-butane diol-adipic acid polyester and MDI (Rubber Chemistry and Technology, Vol. 35, 1962, page 742, Schollenberger et al). Commercially available materials of this category include Estane (trademark), Texin (trademark) 480A, Roylar (trademark) E-85N a polytetramethylene ether glycol based polyurethane elastoplastic, and Cyanaprene (trademark).

Many such products may be described as reaction products of a polymeric polyol (e.g., a polyester glycol or a polyether glycol) with an organic polyisocyanate (whether aromatic, aliphatic or cycloaliphatic), usually a diisocyanate, frequently along with a low molecular weight bifunctional material having two reactive hydrogens, such as a glycol or diamine (see also U.S. Pat. No. 3,462,326, Steele et al., Aug. 19, 1969, especially col. 3, lines 1 to 35; also U.S. Pat. No. 3,678,129, Fischer, July 18, 1972, col. 8, line 65 to col. 2, line 9 and col. 3, lines 19–30). Thermoplastic polyurethane elastomers are high molecular weight materials devoid of olefinic unsaturation; they do not contain available —NCO groups.

The method of preparation of the flame-resistant, self-extinguishing and non-dripping polyurethane compositions of this invention using the preferred polyurethane elastoplastics is to bond the raw elastoplastic on a heated (340° to 360° F.), conventional, two-roll rubber mill and then add the hexaalkoxymethylmelamine, the organic halogen-containing compound and the P-substituted phosphacyclopentene 1-oxide, one at a time, followed by a mixing period of at least three minutes. The resultant, compounded elastomer is then compression molded for about five minutes at a molding pressure of at least 1000 psi and finally cooled while maintaining the molding pressure.

The advantages of this invention may be more fully appreciated by reference to the following example:

rial burning under equilibrium conditions of candle-like burning. Higher "Oxygen Index" indicates decreased relative flammability. In addition, since the method provides a continuous numerical scale for the assignment of relative flammability readings, it is especially appropriate for illustrating differences in the degree of flame retardating provided by additives. Test sample size was $3'' \times \frac{1}{4}'' \times \frac{1}{8}''$.

2. Vertical Burning Test

Performance was determined in substantial accordance with Underwriters Laboratories Subject 94 Vertical (UL-94 V ($\frac{1}{8}$")) Burning Test for Classifying Materials 94-V-O. Five test samples, $5'' \times \frac{1}{2}'' \times \frac{1}{8}''$, were used for each formulation subjected to ignition by a preset flame for 10 seconds, waiting until the flame goes out, reignition for 10 seconds and recording the burning time in seconds. For a VE-O rating, no specimen may have a burning time of more than 10 seconds for each application of the flame, and there cannot be a total flaming combustion time exceeding 50 seconds for the 10 flame applications for each set of 5 test specimens.

The results of these tests are shown in Table I.

TABLE I

| FORMULATION (PARTS) | #1 | #2 | #3 | #4 | #5 | #6 | #7 |
|---|---|---|---|---|---|---|---|
| ROYLAR E85N | 100 | 100 | 100 | 100 | 100 | 100 | 100 |
| PPCO - (1) | — | 5 | 5 | 5 | — | — | 5 |
| MPCCO - (2) | — | — | — | — | 10 | 5 | — |
| Cymel 300 - (3) | — | — | 5 | 4 | — | 3 | — |
| ZOR - (4) | — | — | — | 10 | 13 | 5 | 25 |
| Flammability | | | | | | | |
| Oxygen Index | 20 | 26.2 | 23.3 | 26.7 | 25.9 | 26.2 | 27.3 |
| UL-94V($\frac{1}{8}$") | burns, flaming drip | VE-11, flaming drip | burns, flaming drip | VE-0, No drip | burns, flaming drip | VE-0 No drip | VE-0 No drip |
| Durometer, Shore A - (5) | 85 | 75 | 75 | 81 | 76 | 82 | 71 |
| Tensile strength, psi - (6) | 5850 | 2840 | 2740 | 3440 | 1970 | 2355 | 1380 |
| Elongation, percent - (6) | 560 | 460 | 585 | 630 | 490 | 475 | 303 |

(1) = 1-Phenyl-1-phospha-3-cyclopentene 1-oxide. Prepared by the method of W.B. McCormack in U.S. Pat. 2,663,737, 12/22/53.
(2) = 3-Methyl-1-phenyl-phospha-3-cyclopentene 1-oxide. Prepared by the method of W.B. McCormack in "ORGANIC SYNTHESES", 43, 73 (1963), B. C. McKusick, Editor.
(3) = American Cyanamide 100% hexamethoxymethylmelamine.
(4) = 6-(1',4',5',6',7',7',-hexachloronorborn-6'-en-2'yl)-1,2,3,4,10,10-hexachloro-1,4,4a,5,6,7,8,8a-octahydro-1,4:5,8-dimethanonaphthalene.
(5) = ATM D2240-68
(6) = Scott tensile strength and elongation at break, following the methods of ASTM D412-68 and Scott Model L Tester instructions. A jaw separation rate of 20 inches per minute and a die "C" test sample thickness of 0.10 inch were used.

EXAMPLE I

Samples of polyurethane polymers containing the hexaalkoxymethylmelamine, a halogen compound and a P-substituted phosphacyclopentene 1-oxide were prepared by blending raw polymer on a conventional two roll rubber mill heated to 350° F. and adding the additives one at a time followed by a mixing period of at least three minutes. The mixture was placed into a $6'' \times 8'' \times \frac{1}{8}''$ picture frame mold, compression molded for five minutes at 350° F. and a molding pressure of 1000 psi and then cooled while maintaining the molding pressure. Test samples were fashioned from these compression molded sheets and flammability testing carried out as follows:

1. Oxygen Index

ATM Method D-2863, "Flammability of Plastics Using the Oxygen Index Method." Oxygen Index is the minimum concentration of oxygen, expressed as percent by volume, in a slowly rising mixture of nitrogen and oxygen, that will just support the combustion of a mate- The data show that by themselves the arylphosphacyclopentene 1-oxides are powerful flame retardants, increasing the oxygen index very substantially (codes 2 and 5) and in combination with hexamethoxymethylmelamine and an organo chlorine-containing compound produce formulations which not only self-extinguish within five seconds, but do not produce any flaming drip (Samples 4, 6 and 7). This is accomplished without the use of antimony trioxide, a well-known metallic synergist for organo chlorine-containing compounds.

The term "elastoplastic" as used in the specification and claims means non-rigid polyurethanes which can be worked by mechanical means. It includes those polymers which exhibit true elastic behavior as well as those which have only limited elastic recovery upon deformation. These latter polymers can be processed in the same manner as the elastomeric materials at temperatures of about 325°–400° F.

What is claimed is:

1. A flame-retarded non-drip polyurethane composition comprising:
   (a) a polyurethane elastoplastic polymer;
   (b) about 3 to about 25 parts by weight per 100 parts by weight of polymer of a hexaalkoxymethylmelamine;
   (c) about 5 to about 25 parts by weight per 100 parts by weight of polymer of (1) a non-polymeric organic halogen compound wherein the compound is selected from the group consisting of chlorine and/or bromine containing aliphatic, aromatic and alicyclic compounds having a halogen content of about 35% to about 80% by weight said compound being substantially non-volatile and non-reactive toward the polyurethane polymer or (2) a polymer selected from the group consisting of polyvinylchloride, neoprene and chlorinated polyethylene; and
   (d) about 3 parts to about 20 parts by weight per 100 parts by weight of polyurethane polymer of a P-substituted phosphacyclopentene-1-oxide having the general formula:

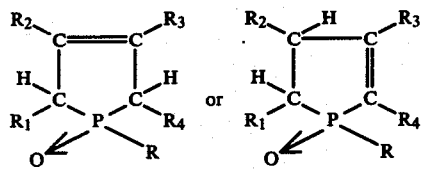

wherein R is $C_1$-$C_4$ alkyl, phenyl or phenyl substituted with bromine or chlorine and $R_1$, $R_2$ $R_3$ and $R_4$ are independently selected from the group consisting of hydrogen, $C_1$ to $C_4$ alkyl, phenyl, chlorine or bromine.

2. The composition of claim 1 wherein the hexaalkoxymethylmelamine has the general formula

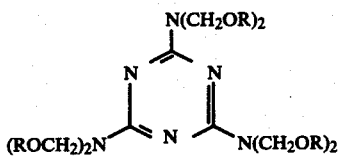

wherein R is a $C_1$-$C_5$ alkyl group.

3. The composition of claim 2 wherein R is methyl, ethyl, propyl, butyl, isobutyl or pentyl.

4. The composition of claim 1 wherein the oxide is 3-methyl-1-phenyl-1-phospha-3-cyclopentene 1-oxide or 1-phenyl-1-phospha-3-cyclopentene 1-oxide.

5. The composition of claim 1 wherein the halogen compound is 6-(1',4',5',6',7',7',-hexachloronorborn-5'-en-2'yl)-1,2,3,4,10,10-hexachloro-1,4,4a,5,6,7,8,8a-octahydro-1,4:5,8-dimethanonaphthalene.

6. The composition of claim 1 wherein the melamine compound is present at about 3 to about 10 parts by weight based on 100 parts by weight of polyurethane.

7. The composition of claim 1 wherein the oxide is present at about 5 to about 10 parts by weight based on 100 parts by weight of polyurethane.

8. The composition of claim 1 wherein the halogen compound is present of about 5 to about 10 parts by weight based on 100 parts by weight of polyurethane.

9. A method for rendering a polyurethane elastoplastic 9 polymer flame-retarded and non-drip at combustion temperatures which comprises blending the elastoplastic with
   (a) about 3 to about 25 parts by weight per 100 parts by weight of polymer of a hexaalkoxymethylmelamine;
   (b) about 5 to about 25 parts by weight per 100 parts by weight of polymer of (1) a non-polymeric organic halogen compound wherein the compound is selected from the group consisting of chlorine and/or bromine containing aliphatic, aromatic and alicyclic compounds having a halogen content of about 35% to about 80% by weight said compound being substantially non-volatile and non-reactive toward the polyurethane polymer or (2) a polymer selected from the group consisting of polyvinylchloride, neoprene and chlorinated polyethylene; and
   (c) about 3 parts to about 20 parts by weight per 100 parts by weight of polyurethane polymer of a P-substituted phosphacyclopentene-1-oxide having the general formula:

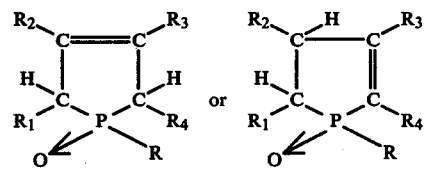

wherein R is $C_1$-$C_4$ alkyl, phenyl or phenyl substituted with bromine or chlorine and $R_1$, $R_2$ $R_3$ and $R_4$ are independently selected from the group consisting of hydrogen, $C_1$ to $C_4$ alkyl, phenyl, chlorine or bromine.

10. The method of claim 9 wherein the melamine compound is present at about 3 to about 10 parts by weight, the halogen compound or chlorine-containing polymer is present at about 5 to about 10 parts by weight and the oxide is present at about 5 to about 10 parts by weight all based on 100 parts by weight of elastoplastic.

11. The method of claim 9 wherein the hexaalkoxymethylmelamine has the general formula

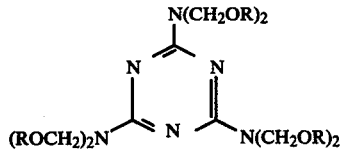

wherein R is a $C_1$-$C_5$ alkyl group.

12. The method of claim 11 wherein R is methyl, ethyl, propyl, butyl, isobutyl or pentyl.

13. The method of claim 9 wherein the halogen-containing compound is 6-(1',4',5',6',7',7'-hexachloronorborn-5'-en-2'yl)-1,2,3,4,10,10-hexachloro-1,4,4a,5,6,7,8,8a-octahydro-1,4:5,8-dimethanonaphthalene and the oxide is 3-methyl-1-phenyl-1-phospha-3-cyclopentene 1-oxide or 1-phenyl-1-phospha-3-cyclopentene 1-oxide.

14. The method of claim 12 wherein R is methyl.

* * * * *